United States Patent

Klett et al.

[11] 4,063,108
[45] Dec. 13, 1977

[54] INVERTER LOCKOUT CIRCUIT

[76] Inventors: Keith Karl Klett, 203 E. 13th St.; Robert Philbrick Alley, 9 Laurel Drive, both of Danville, Ill. 61832

[21] Appl. No.: 646,009

[22] Filed: Jan. 2, 1976

[51] Int. Cl.² .................................................. H02J 9/00
[52] U.S. Cl. ........................................ 307/64; 307/66; 307/326; 363/56
[58] Field of Search ...................... 307/64, 66, 94, 326, 307/327, 328; 321/18, 11, 14; 240/51, 11 R, 11; 340/253 B; 315/DIG. 5, 86, 100

[56] References Cited
U.S. PATENT DOCUMENTS 3,356,891  12/1967  Godard .............................. 307/66 X
3,919,621  11/1975  Wechsler .............................. 321/18
3,921,005  11/1975  Watrous .............................. 307/64

Primary Examiner—Robert K. Schaefer
Assistant Examiner—Morris Ginsburg

[57] ABSTRACT

An emergency lighting system includes a switching transistor inverter circuit for starting and operating a fluorescent lamp from a battery upon failure of line voltage. A lockout arrangement serves to shut down inverter operation should the lamp be removed from its fixture. Included is an interlock in the lamp fixture and circuitry responsive to an open condition at the interlock to ground the input to a system controller inhibit function thereby to effect removal of battery power from the inverter circuit.

16 Claims, 2 Drawing Figures

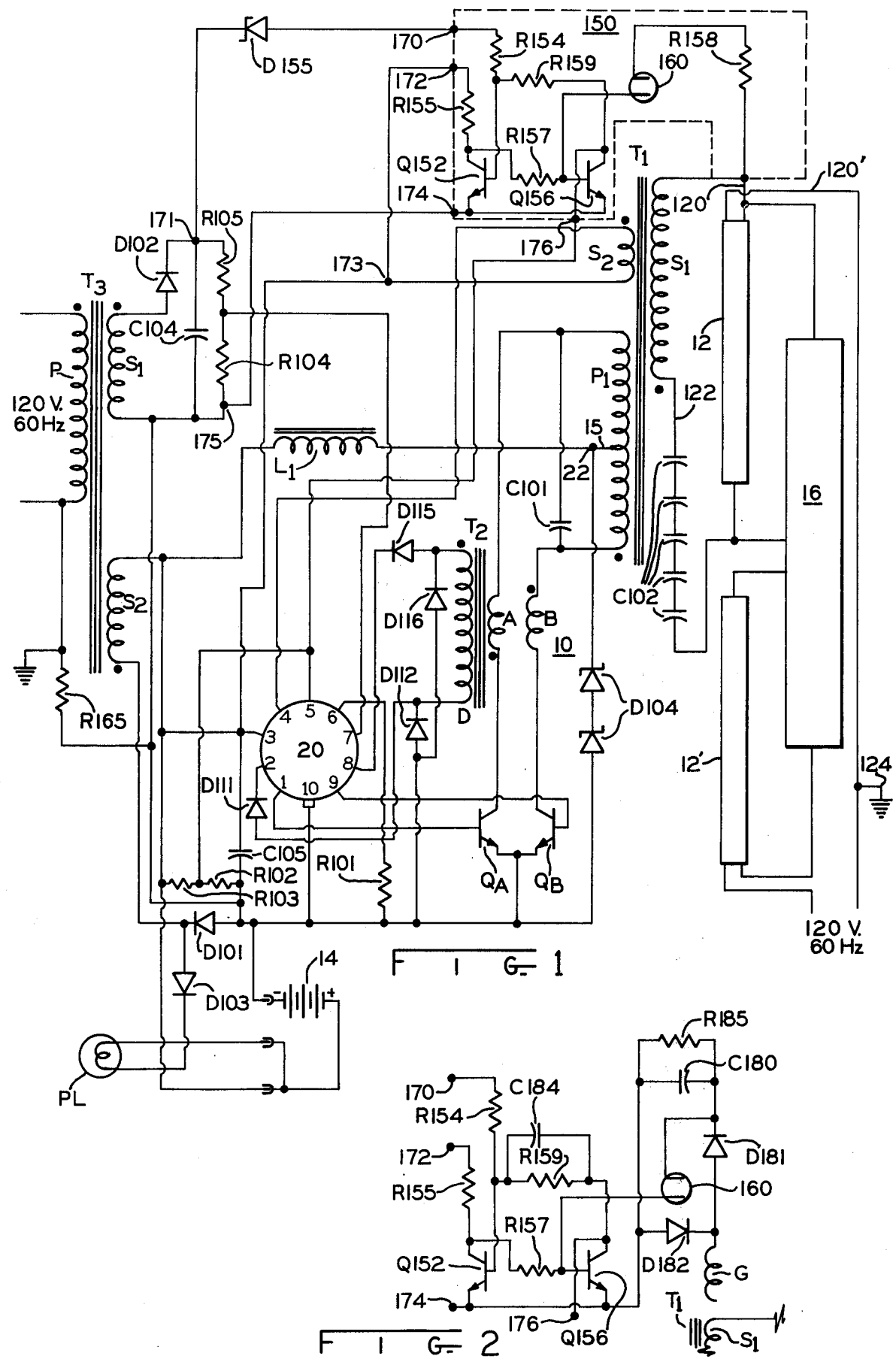

INVERTER LOCKOUT CIRCUIT

BACKGROUND OF THE INVENTION

I. Field of the Invention

The present invention relates to a lockout arrangement for an inverter circuit, and more particularly, to an emergency lighting circuit including an inverter for operating a gaseous discharge lamp from a DC electrical energy source upon failure of the primary AC source, the circuit being provided with means for shutting down inverter operation if the lamp is removed from the circuit.

II. Description of the Prior Art

Electric power failures due to inclement weather conditions and equipment breakdowns have been a plague for many years. A power failure, no matter what the cause may be, may very well jeopardize human life due to lighting system failure. There are, therefore, many installations which require some type of emergency lighting system which will automatically come into operation upon the occurrence of a power failure. The high efficiency of a fluorescent lamp makes it especially valuable for use in such an emergency lighting system.

Presently available emergency lighting systems are generally of the type using a transistor switching inverter and wherein a single lamp or group of lamps is used for both normal AC operation of the lighting system and for the emergency system, a battery being used as the power source for energizing the transistor inverter and the lamps when the AC line voltage fails. A system designed especially for use with fluorescent lamps which are eight feet in length or longer, must be designed to reliably hot spot and operate such lamps under an assortment of adverse conditions. Such conditions include degraded or partially discharged batteries, old lamps, and after long periods of operating the battery at high temperatures. Therefore, when the system ages, the inverter must still be capable of generating a high voltage and appreciable power in order to reliably start the lamp. When conditions are optimum, such as at the beginning of the system's life, the inverter is capable of generating an even higher voltage and more power. In such a condition, if the lamp is removed from the socket, the combination of stray capacitance in the fixture, the power system, and the inverter furnish potential high frequency return paths and extreme safety hazards should a person contact exposed lamp terminals or lamp socket terminals.

It is desirable, therefore, to provide an emergency lighting system including an inverter circuit wherein such potential electrical shock hazards are obviated.

Accordingly, it is an object of the present invention to provide an emergency lighting system having an inverter wherein means are provided for shutting down inverter operation when a lamp is removed from its socket in the fixture allowing the circuit to be placed in an unloaded condition.

SUMMARY OF THE INVENTION

In accordance with the present invention, there is provided an improved circuit having an inverter including an output for operating at least one gaseous discharge lamp from a DC electrical energy source. Included are means for shutting down inverter operation when the circuit is placed in an unloaded condition by at least partial removal of the lamp from the circuit when the inverter is operating such that circuit output voltage rises substantially above normal loaded output voltage. In the preferred embodiment, this includes inhibit means for turning off the inverter circuit when the DC source voltage drops below a predetermined level, the means for shutting down further including a bistable flip-flop responsive to an unloaded condition at the circuit output to effect turn-on of the inhibit means thereby to turn-off the inverter circuit.

In another aspect of the present invention, there is provided in an emergency lighting circuit for operating at least one gaseous discharge lamp including means for connection to an AC electrical energy source for energizing the lamp during normal conditions when the AC source voltage is above a predetermined value and a transistor switching inverter and a DC electrical energy source for energizing the lamp during emergency conditions when the AC source voltage is below a predetermined value, the improvement comprising means for shutting down inverter operation when the inverter is placed in an unloaded condition by at least partial removal of the lamp from the circuit when the inverter is operating such that inverter output voltage rises substantially above normal loaded output voltage.

BRIEF DESCRIPTION OF THE DRAWINGS

In the accompanying drawings:

FIG. 1 is a detailed schematic representation of the preferred embodiment of the circuit of the present invention, in one form thereof; and FIG. 2 is a schematic representation of another form of the preferred embodiment of the present invention.

DESCRIPTION OF THE PREFERRED EMBODIMENT

Referring to FIG. 1, there is shown an emergency lighting system circuit which will automatically become operative upon failure of the primary electric source. Such a system is disclosed and claimed in U.S. Pat. No. 3,921,005 — Watrous, assigned to the same assignee as the present invention and which is specifically incorporated herein by reference. A tuned inverter 10 includes a pair of power transistors $Q_A$ and $Q_B$ capable of operation in a low loss switching mode to energize a load such as gaseous discharge lamp 12. An auxiliary electrical energy source in the form of a rechargeable battery 14 provides the electrical power necessary to operate inverter 10. A buffer inductance L1 serves to enable transistors $Q_A$ and $Q_B$ to operate in the low loss switching mode. A first transformer T1 couples the inverter 10 with the lamp 12 and is resonated with capacitors C101 and C102 to set the operating frequency of the inverter and to establish a sinusoidal output voltage. Inductor L1 is electrically connected with center tap 15 of primary winding P1 forming a part of transformer T1.

A control circuit 20 (in the preferred embodiment, an integrated circuit) is provided for supplying base drive for switching transistor $Q_A$ and $Q_B$ at zero collector voltage: that is, when the instantaneous voltage across capacitor C101 is zero. Thus, as the primary voltage across transformer T1 varies at fundamental frequency, the voltage at point 22 and hence across inductor L1 varies at twice the fundamental frequency. The current through L1 is DC with a second harmonic component. This same current is alternately carried by the two transistors $Q_A$ and $Q_B$. While the transistors are required to switch collector current, they do so at essentially zero collector voltage with a resultant low power dissipation. An auxiliary winding S2 magnetically coupled with the primary winding P1 of first transformer T1 provides timing information to the control circuit 20 for effecting switching of the respective transistors $Q_A$ and $Q_B$ in step with the natural resonant frequency of the inverter. Thus, the control circuit 20 tracks the resonant frequency of first transformer T1 and insures that transistor switching occurs when the voltage across capacitor C101 is zero. Winding T1 S2 is not used as a source of energy for driving the transistors $Q_A$ and $Q_B$ because of its sinusoidal waveform.

A feedback transformer T2 is provided to supply a feedback current to the control circuit 20 for effecting transistor base drive proportional to transistor collector current thereby to effect higher efficiency in inverter 10. Feedback transformer T2 has a feedback winding D magnetically coupled to the respective collectors of the transistors $Q_A$ and $Q_B$ through a pair of windings A and B, respectively. Thus, the power consumed by the control circuit 20 can be limited to that required to start and control the oscillation of inverter 10. Lamps 12 and 12' are coupled to an AC source through a conventional ballast 16 for operation during normal conditions when the AC source voltage is above a predetermined value. An impedance limited transformer T3 provides among other things, means for charging the battery 14. Battery 14 is connected to a secondary winding S2 of transformer T3 through a diode D101.

The emergency lighting system circuit shown in FIG. 1 operates generally as follows. Control circuit 20 includes a first sensor (not shown) for sensing the voltage of the AC source and a second sensor (not shown) for sensing the voltage of the battery. Further details of operation of the control circuit 20 may be had by referring to the above-mentioned Watrous patent. Control circuit 20 also includes logic means (not shown) combining the outputs of the first sensor and the second sensor to enable inverter 10 when the battery voltage is above a predetermined level and the AC voltage is below a predetermined level and to disable the inverter when the battery voltage is below a predetermined level or the AC voltage is above a predetermined level.

Assuming now that the inverter 10 is enabled to run, control circuit 20 supplies a small base drive signal to one of the transistors $Q_A$ and $Q_B$. Assuming that the base drive is applied to $Q_A$, transistor $Q_A$ turns on and current starts to flow from battery 14 through inductor L1, center tap 15 of the primary P1 of the transformer T1, thence through P1 and through the A winding of feedback transformer T2, through transistor $Q_A$, thence back to the battery. The base drive originally supplied to transistor $Q_A$ is augmented by a current flowing from winding D of feedback transformer T2 to the control circuit 20 to exit from pin 1 thereof thence to flow through the base of transistor $Q_A$. This base drive then is proportional to the collector current of transistor $Q_A$ and is designed to be adequate to keep the transistor in saturation.

At some volt-second product, feedback transformer T2 saturates sharply, suddenly reducing the output current of winding D thereof, thereby reducing the base drive to transistor $Q_A$. A sudden rise in collector-emitter voltage on transistor $Q_A$ sharply reduces the rate of current rise in this DC circuit. This change in collector current with respect to time reverses the polarity of the S2 winding of transformer T1 and hence the polarity of the voltage on pins 3 and 4 of the control circuit 20.

This reversal of polarity signals the control circuit to change the base drive from transistor $Q_A$ to transistor $Q_B$.

Control circuit 20 now supplies a small amount of base drive through pin 9 to the base of transistor $Q_B$ and simultaneously connects the base of $Q_A$ to the emitter thereof to hasten the turn-off process of transistor $Q_A$. Transistor $Q_B$ then starts to conduct as a result of the small base drive signal from the control circuit and current flows through winding B of feedback transformer T2 to induce a current in winding D thereof. This current is supplied to control circuit 20. Control circuit 20 now supplies this current as base drive out of pin 9 to the base of $Q_B$; thus, the base drive of $Q_B$ is proportional to the collector current thereof such that the transistor is kept in saturation.

Transformer T1 has an air gap and operates as a nearly linear inductor. When the voltage across winding P1 of transformer T1, and thereby the voltage on winding S2 of that transformer, reaches zero, this event is signaled to the control circuit 20 through pins 3 and 4 thereof. The control circuit again switches the base drive circuitry to transistor $Q_A$ and connects the base of $Q_B$ to the emitter thereof to hasten the switching off of the transistor $Q_B$. The circuit is then ready to go through the next half cycle with $Q_A$ conducting.

If switching could be accomplished in absolute zero time, the above described circuit operation would be entirely correct. However, the switching is accomplished normally in periods of less than 1 microsecond and the current flow from the battery 14 is essentially at a constant level with a small ripple content. This ripple content is determined by the inductance of L1 which adds or subtracts from the battery voltage as applied to the center tap 15 on the primary winding on the transformer T1. It is this inductor L1 which adjusts the voltage at point 22 in such a way that the transistors may be switched at zero collector voltage. As long as this inductance L1 has a value exceeding a critical value, the circuit will function as described. In the event that both transistors $Q_A$ and $Q_B$ are in the off state, the rate of current change in L1 forces the voltage thereacross to a value where zener diodes D104 start conducting to limit the voltage applied to the circuit. This clipping action rapidly reduces circuit efficiency and hence is an operational mode to be avoided. Such clipping action can occur momentarily during the starting process or when the inverter is turned off and under these conditions represents an acceptable design operating condition.

The load for the inverter 10 which includes lamp 12 is connected to winding S1 of transformer T1. For fluorescent emergency lighting purposes, the ballasting is done by capacitors C102 which determine the load current through the lamp 12. These capacitances in conjunction with C101 and the inductance of T1 P1 determine the operational frequency of this system. (The inductance of the P1 winding and the capacitance of C101 determine the oscillating frequency when S1 is unloaded ) A quintuple capacitive ballast system is used to reduce the voltage across a single unit and thus enhance the reliability of the complete system. The voltage output of the inverter circuit is high enough to instant start eight foot long, instant start lamps under fairly adverse conditions.

As stated above, battery charging is accomplished through winding S2 of 60 Hz transformer T3. Half-wave charging current is coupled to a nonlinear load, battery 14, through diode D101 and is limited in magnitude by the impedance of the transformer. Because of the transformer impedance, the sinusoidal voltage at the terminals of winding S2 is clamped at the battery voltage when diode D101 conducts. On the alternate half cycle, diode D103 conducts half-wave current through indicator lamp PL and the three prong battery plug. Thus, the battery must be plugged in and 120 volt AC power available to energize lamp PL indicating that the battery is charging. Using the alternate half cycle reduces the volt-amp rating of the transformer T3. For monitoring the AC source voltage, means are provided for coupling secondary winding S1 of the transformer T3 with a linear load during an alternate half cycle. To this end, during the half cycle alternate from that in which the battery is charged, capacitor C104 is charged through diode D102. This DC monitoring voltage is connected to the first sensor means through pin 7 of control circuit 20 and through a linear load, resistor divider R104 and R105. The DC voltage at pin 7 is proportional to the average value of the 60 Hz supply voltage and is not influenced by the aforesaid clamping action of the battery. Thus, transformer T3 serves a dual purpose.

As hereinbefore stated, it is desirable that an emergency lighting system which includes an inverter circuit be provided wherein potential shock hazards resulting from removal of the fluorescent lamp from its fixture be obviated. In accordance with the present invention, there is provided, in an inverter circuit for operating at least one gaseous discharge lamp from a DC electrical energy source, means for shutting down inverter operation when the circuit is placed in an unloaded condition such that circuit output voltage rises substantially above normal loaded output voltage. In the preferred embodiment as shown in FIG. 1, inverter circuit 10 is of the transistor switching type and includes output transformer T1 including secondary winding S1 for connecting the inverter 10 with the lamp 12. Secondary winding S1 of transformer T1 includes output means in the form of a pair of output leads 120 and 122 connected to lamp 12. A plurality of capacitors C102 are connected between lamp 12 and output lead 122 of secondary winding S1 and provide the ballasting necessary for emergency lighting purposes when lamp 12 is powered by the inverter circuit. Output lead 120 is connected to ground at point 124 through an interlock (not shown) located in the lamp fixture (also not shown) when the lamp 12 is securely in the fixture. With this arrangement, when lamp 12 is removed from its fixture, only lead 120' is grounded and the interlock connection between leads 120 and 120' is broken thereby allowing the lead 120 to float.

As disclosed and described in the aforementioned Watrous patent, U.S. Pat. No. 3,921,005, control circuit 20, which may be in the form of an integrated circuit, includes inhibit means connected to pin 5 thereof for removing operating DC voltage from the inverter circuit when the DC source voltage drops below a predetermined level. By the present invention, means are provided for grounding the input at pin 5 of the control circuit 20 thereby effecting inverter circuit shutdown. To this end there is included a shutdown circuit generally denoted as 150 and shown enclosed by dotted lines. Shutdown circuit 150 includes a bistable flip-flop responsive to an unloaded condition at the inverter output (leads 120 and 122) to effect turn-on of the inhibit means thereby to remove operating DC voltage from the inverter circuit. Included in the bistable flip-flop are a pair of transistors Q152 and Q156. The bistable flip-flop is operable, in a first state, to allow operation of the inverter circuit when energized, and is operable, in a second state, in response to the unloading of the inverter circuit output to effect grounding of the input of the inhibit means. With 120 volts AC applied to the primary P of transformer T3, transistor Q152 is turned on by a voltage from secondary S1 of transformer T3 through zener diode D155 and resistor R154. Second transistor Q156 is thus biased to the off state through resistors R157 which is connected to the collector of transistor Q152. When AC power is removed from the input to the primary P of transformer T3, inverter 10 begins to operate and runs normally until the battery voltage drops below a predetermined level as sensed by pin 5 of the control circuit 20. Should the lamp 12, which is operated by the inverter, be removed from its fixture, line 120 and thereby the finish of winding S1 of the transformer T1 is no longer grounded. The voltage on line 120 is then applied through a resistor R158 to a breakdown device in the form of a neon lamp 160. When the breakdown level is exceeded, current flows through neon lamp 160 to turn on transistor Q156, turning off transistor Q152 and shorting pin 5 of control circuit 20 to ground, thus shutting down the inverter 10. Inverter 10 then stays off until this electric latch is reset by application of alternating current voltage to the primary winding P of transformer T3.

Referring now to FIG. 2, there is shown another form of the preferred embodiment of the present invention. As in the form of the embodiment as shown in FIG. 1, with 120 volts AC applied to the primary P of transformer T3, transistor Q152 is turned on by a voltage from secondary S1 of transformer T3 through zener diode D155 and resistor R154. This serves to keep transistor Q156 in the off state as the base thereof is connected through a resistor R154 to the collector of Q152. When AC power is removed from the primary P of transformer T3, the inverter runs normally until the battery voltage drops below a predetermined level as sensed by pin 5 of the control circuit 20. As in FIG. 1, should lamp 12 be removed from its fixture, lead 120 and thereby the finish of winding S1 of transformer T1 is no longer grounded due to the opening of the interlock in the lamp fixture. When this happens, a guard winding G associated with transformer T1 through electrostatic operation serves to charge a capacitor C180 through diodes D181 and D182. When the breakdown voltage of the neon lamp 160 is exceeded, transistor Q156 is turned on shorting pin 5 of the control circuit 20 to ground thereby turning off transistor Q152 and the inverter. The inverter 10 stays shut down until the latch is reset again by application of AC voltage to the primary winding P of transformer T3.

The emergency lighting system including the inverter and lockout circuit of FIG. 1 has been built and has operated satisfactorily with components having the following values:

| | |
|---|---|
| Transistors $Q_A$, $Q_B$ | GE D42C10 |
| Transformer T1 | Primary winding D1 - 72 turns tapped at 36 turns |
| | Load winding S1 - 1788 turns |
| | Feedback winding S2 - 12 turns |
| Transformer T2 | Collector windings A & B - 8 turns |
| | Output winding D - 160 turns |
| Transformer T3 | Primary winding P - 1058 turns |
| | Secondary winding S1 - 260 turns |
| | Secondary winding S2 - 224 turns |
| Inductor L1 | 120 turns .0359" |

-continued

| | |
|---|---|
| Lamps 12, 12' | F96T12/IS |
| Battery 14 | 16.8 V DC |
| Resistor R101 | 15 K ohms |
| Resistor R102 | 56 K ohms |
| Resistor R103 | 56 K ohms |
| Resistor R104 | 18 K ohms |
| Resistor R105 | 270 K ohms |
| Capacitor C101 | 0.68 µF |
| Capacitors C102 (5) | .0075 µF (ea) |
| Capacitor C105 | .01 µF |
| Capacitor C104 | .33 µF |
| Diodes D101, D102, D103 | IN 4004 |
| Diodes D111, D112, D115, D116 | DA 1701 |
| Zener Diodes D104 (2) | 21 V ± 5%, ¼W (ea) |
| Transistors Q152, Q156 | 2N 5449 |
| Zener Diode D155 | 21 V zener |
| Resistor R154, R155, R157 | 100 K ohm |
| Resistor R158 | 470 K ohm |
| Resistor R159 | 22 K ohm |
| Neon lamp 160 | (less than 100 V breakdown) |

An emergency lighting system having the lockout circuit of FIG. 2 has been built and has operated satisfactorily with additional components having the following values:

| | |
|---|---|
| Guard Winding G | 112 turns |
| Capacitor C180 | .01 ufd |
| Capacitor C184 | .001 ufd |
| Diodes D181, D182 | DA 1701 |
| Resistor R185 | 1 megohm |

The specific inverter circuit and/or emergency lighting circuits herein described are intended as exemplary and not limitative of the invention. For example, an inverter need not be coupled to a load by a transformer; direct coupling has been contemplated, however, with appropriate circuitry changes. In such applications, other power level switching arrangements will occur to those skilled in the art. Other inverter configurations certainly have been contemplated and include the bridge switching type and others. Breakdown devices of the solid-state type have also been employed. The appended claims are intended to include such modifications, and others which may occur to those skilled in the art, as coming within the true spirit and scope of the invention.

What is claimed is:

1. In a circuit having an inverter including an output for operating at least one gaseous discharge lamp from a DC electrical energy source, the improvement comprising:
   means for shutting down inverter operation including means responsive to placing the output in an unloaded condition by at least partial removal of said at least one gaseous discharge lamp from the circuit when the inverter is operating.

2. The invention of claim 1 wherein: the means for shutting down includes inhibit means for turning off the inverter when the DC source voltage drops below a predetermined value and further includes a bistable flip-flop responsive to the unloaded condition at the inverter output to effect turn-on of the inhibit means thereby to turn off the inverter.

3. The invention of claim 2 wherein the inverter is of the transistor switching type.

4. The invention of claim 3 wherein the transistor switching type inverter includes a pair of transistors operable in a push-pull arrangement.

5. In an inverter circuit for operating a gaseous discharge lamp from a DC electrical energy source, the improvement comprising:
   input means for connection to the DC source;
   output means for connection to the lamp;
   inhibit means having an input connected to the input means for shutting down the inverter circuit when the DC source voltage drops below a predetermined value;
   means for forcing the DC voltage at the input to the inhibit means to drop below the predetermined value when the lamp is at least partially removed from the output means placing the circuit in an unloaded condition whereby inverter circuit turn-off is effected.

6. The circuit of claim 5 wherein the means for forcing includes a bistable flip-flop operable in a first state to allow the operation of the inverter circuit when energized, and operable in a second state in response to the unloading of the inverter circuit output means to effect forcing of the input to the inhibit means.

7. The circuit of claim 6 wherein a first side of the inverter circuit output means is adapted for connection to ground through an interlock when the circuit is in a loaded condition, and upon unloading, the interlock is opened allowing the first side of the output means to depart from ground to cause the bistable flip-flop to go to the second state.

8. In an emergency lighting circuit for operating at least one gaseous discharge lamp including means for connection to an AC electrical energy source for energizing the lamp during normal conditions when the AC source voltage is above a predetermined value and a transistor switching inverter including an output and a DC electrical energy source for energizing the lamp during emergency conditions when the AC source voltage is below the predetermined value, the improvement comprising:
   means for shutting down inverter operation including means responsive to placing the inverter output in an unloaded condition by at least partial removal of said at least one gaseous discharge lamp from the circuit when the inverter is operating.

9. The invention of claim 8 wherein the inverter includes an input for connection to the DC source.

10. The invention of claim 9 wherein: the means for shutting down includes inhibit means for turning off the inverter when the DC source voltage drops below a predetermined value and further includes a bistable flip-flop responsive to the unloaded condition at the inverter output to effect turn-on of the inhibit means thereby to turn off the inverter.

11. The invention of claim 10 wherein the inhibit means includes an input connected to the DC source.

12. The invention of claim 11 wherein the bistable flip-flop is operable in a first state to allow operation of the inverter when energized, and operable in a second state in response to removal of the at least one gaseous discharge lamp from the circuit causing unloading of the inverter output to effect forcing of the DC voltage at the input to the inhibit means to drop below the predetermined value thereby to shut down the inverter.

13. The invention of claim 12 wherein a first side of the inverter output is adapted for connection to ground through an interlock when the inverter is energized and the at least one gaseous discharge lamp is in circuit, and upon removal of the at least one gaseous discharge lamp from the circuit, the interlock is opened allowing the first side of the inverter output to depart from ground potential to cause the bistable flip-flop to go to the second state.

14. The invention of claim 13 wherein the means for shutting down further comprises:
a voltage breakdown device connected between the bistable flip-flop and the first side of the inverter output for effecting switching of the bistable flip-flop to the second state when the first side of the inverter output departs from ground potential, thereby effecting inverter shutdown.

15. The invention of claim 13 wherein the inverter includes an output transformer having an input winding connected to the inverter, an output winding connected to the inverter output, and a guard winding operable to charge a capacitor when the first side of the inverter output departs from ground potential.

16. The invention of claim 15 wherein the means for shutting down further comprises:
a voltage breakdown device operable in response to charging of the capacitor to effect switching of the bistable flip-flop to the second state, thereby effecting inverter shutdown.

* * * * *